UNITED STATES PATENT OFFICE.

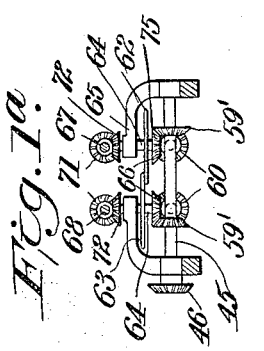

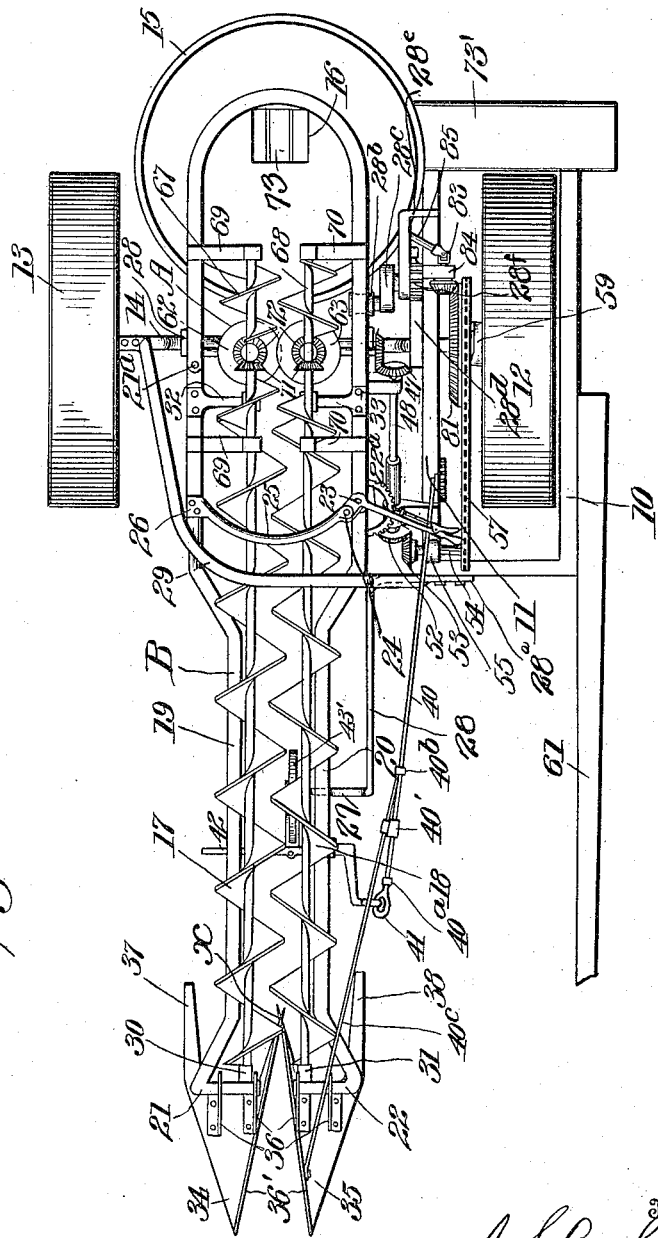

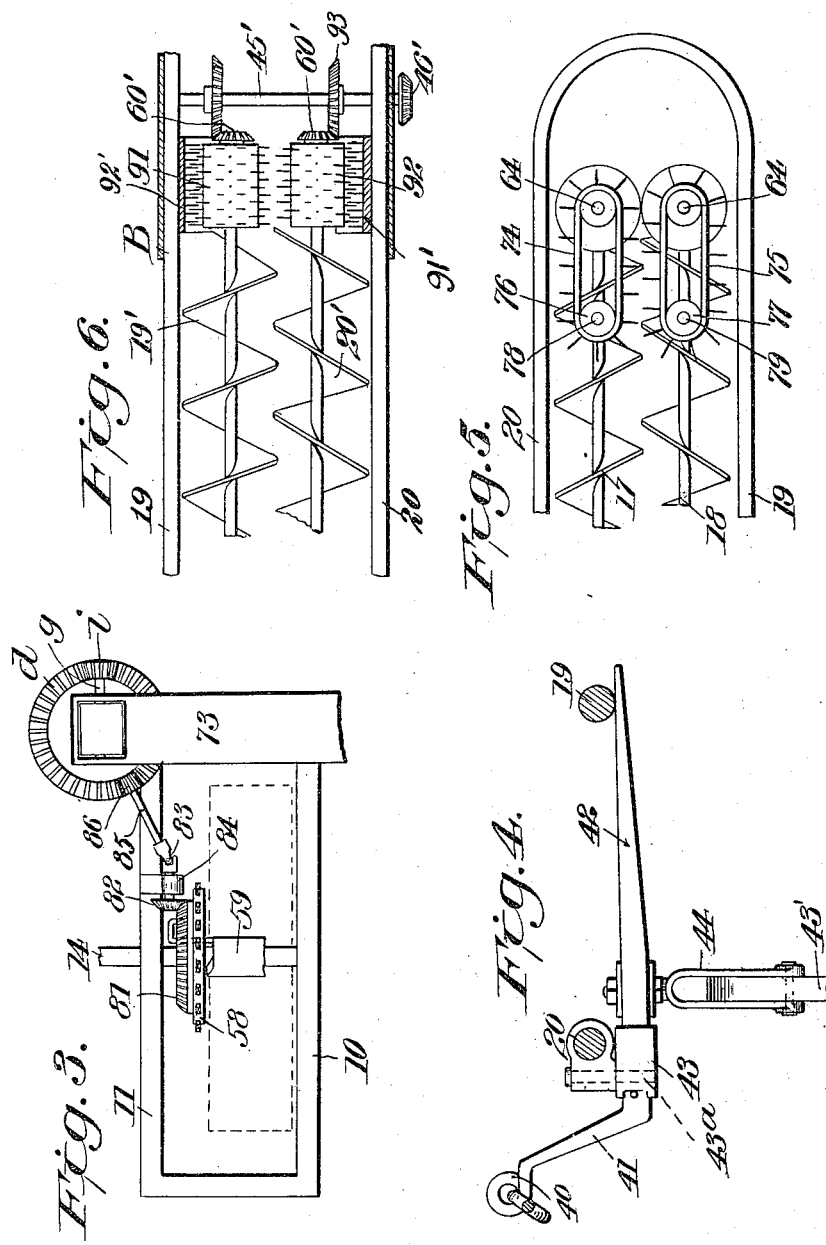

J SIDNEY BACHTEL, OF HIGGINS, TEXAS.

HARVESTER.

1,204,536.

Specification of Letters Patent.

Patented Nov. 14, 1916.

Application filed May 13, 1914. Serial No. 838,357.

*To all whom it may concern:*

Be it known that I, J SIDNEY BACHTEL, a citizen of the United States, residing at Higgins, in the county of Lipscomb and State of Texas, have invented certain new and useful Improvements in Harvesters, of which the following is a specification.

This invention relates to harvesters.

One object of the invention is to provide a machine capable of straightening up stalks which have blown flat upon the ground, which is very often the case, and hoisting or elevating the stalks so that the heads thereof may be readily topped and dropped into a suitable receptacle from which the topped material may be conveyed to any suitable receptacle or other container not shown in the drawings.

Another object resides in the provision of a harvesting machine embodying among other characteristics means whereby the stalks may be straightened up and their heads elevated and cut and subsequently discharged into a suitable receptacle and conveyed therefrom to any suitable receptacle or other container not shown in the drawings with means provided as an auxiliary to the straightening or conveying means to convey the topped material to the receptacle.

A still further object of the invention is to provide a harvesting machine embodying an element which is swingingly mounted from a supporting means on the frame of the machine and which may be readily raised and lowered to throw the elevating means into and out of operation and, when in operative position capable of straightening up stalks that have fallen to the ground so that the heads of the stalks may be readily topped by suitable mechanism carried by the elevator frame and discharged into a suitable receptacle and which machine may be readily converted into or provided with means whereby the topped material may be threshed in the field.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is a side elevation. Fig. 1ª is a detail sectional view on the line $z$—$z$ of Fig. 1. Fig. 2 is a top plan view. Fig. 3 is a fragmentary detail plan view of the topped material elevator operating mechanism. Fig. 4 is a transverse sectional view on the line $a$—$a$ of Fig. 1 with parts removed. Fig. 5 is a fragmentary top plan view of a modified form of auxiliary conveyer. Fig. 6 is a fragmentary top plan view illustrating means for threshing the material in the field. Fig. 7 is a detail sectional view through the lower part of the hopper illustrating the mounting therefor and the mounting for the conveyer casing.

Referring now more particularly to the accompanying drawings there is shown a body frame including side sills 10 and 11 carried by drive wheels 12 and 13 journaled on a suitable axle 14.

A hopper 15 is supported on the structure in any suitable manner and is provided with an opening 16. The hopper is adapted to receive the topped material as it is severed from the stalks by the cutting mechanism A, to be hereinafter described. This hopper 15 has in coöperation therewith an elevator 73 mounted in a casing 73'. The elevator 73—73' and the hopper are mounted preferably so that the same may revolve to load a receptacle on either side of the machine. For instance, on the body frame may be mounted a plate $a$ having an opening $b$ to rotatably receive the tubular hub $c$ of the beveled gear $d$ having an opening $e$ into which latter and the tubular hub $c$ is loosely mounted the journal $f$ of a bracket including arms $e'$ which straddle opposite sides of and are secured to the elevator casing 73'. Through these bracket arms $e'$ and the elevator casing is journaled a shaft $g$ carrying a pulley $h$ to run the conveyer 73, there being a beveled pinion $i$ on the shaft $g$ in mesh with the aforesaid gear $d$ so that as the latter rotates the pinion $i$ in mesh therewith causes rotation of the shaft $g$ and consequent operation of the elevator.

To convey the material to be topped to the cutting mechanism A, I provide a suitable elevating mechanism consisting preferably of right and left hand screw elements 17 and 18. These screw elements are preferably journaled in an elevator frame B. This elevator frame B is preferably of U-shaped formation including legs 19 and 20, the lower ends of which are disposed in planes below the upper ends thereof and each having its lower end preferably directed inwardly as indicated at 21 and 22, respectively. The leg 19 is preferably composed of two parts hingedly connected together at 21$^a$ and by virtue of this hinge connection 21$^a$ the legs 19 and 20 may be slightly spread. This spreading of the legs 19 and 20 may be effected through the instrumentality of a suitable lever 22$^a$ pivoted at 23 on the leg 20 of the elevator frame and having pivotal connection at 24 with the arched link 25 secured at 26 to the leg 19 of the elevator frame.

The elevator frame is preferably mounted for swinging movement so that it may be raised and lowered, the same being preferably disposed upon an incline. One means for swingingly mounting the elevator frame B is to hingedly suspend the leg 20 adjacent its upper end upon the hinge pintle 27 carried by the bracket 28 secured at 28$^a$ to a convenient portion of the frame. A roller 28$^b$ supports the upper end of the frame B. This roller 28$^b$ is carried by a crank arm 28$^c$, journaled in a vertically extending bracket 28$^d$ secured to the side sill 10. The arm 28$^c$ is provided with an operating crank 28$^e$ which can be locked by any suitable means such as shown at 28$^f$. The operation of the crank 28$^f$ obviously raises or lowers the roller 28$^b$ to at all times engage the frame B to support the same.

A suitable brace rod 29 is attached to the axle 14 adjacent the leg 12, and passes over the legs 19 and 20 and conveyer elements 17 and 18 to the forward end of the side sill 10 to which it is attached in any preferred manner.

One means for mounting the screws 17 and 18 in the elevator frame B is to journal their lower ends in suitable bearings 30 and 31, respectively, with their upper ends journaled in suitable brackets 32 and 33, respectively. The result is that when the elevator frame is swung upwardly the screws 17 and 18 are moved accordingly and that when the leg 19 of the elevator frame is spread laterally on its hinge 21$^a$ the screw 17 is moved with the leg 19 accordingly.

The harvester is shown in position in Fig. 1 wherein it will be seen that at the forward end of the elevator frame runners 34 and 35 are provided. The runners 34 and 35 are retained normally in their horizontal position by the weight of the same. It will be noted that these runners 34 and 35 are swung at points intermediate their ends so that they will be evenly balanced and held in the position shown in Fig. 1. These runners are preferably provided with ribs 36 secured to the runners and by means of which ribs 36 the runners are swingingly mounted on the inturned ends 21 and 22 of the legs 19 and 20 of the elevator frame. These runners 34 and 35 have rearward extensions 37 and 38, respectively, to provide for an efficient engaging surface with the ground, the runners bearing preferably flat on the ground, as shown in Fig. 1. The runners may be of any desired formation but they are preferably of the form illustrated with the converging inner edges shown overlapping at the point $x$ but which overlapping will not exist upon the spreading of the leg 19 of the elevator frame with relation to the leg 20 of the elevator frame. Each runner is preferably provided along its inner edge with a rib 36′ designed to slide under the stalks to force the latter up into engagement with the screws 17 and 18.

The U-shaped elevator frame may be tilted upwardly at its forward end and the runners lifted from the ground by the operation of a lever 39 journaled on the body frame of the machine and which has a rod 40 leading to a crank 41 on the end of a rock shaft 42 journaled in a suitable bracket 43 pivoted as at 43$^a$ on the leg 20 of the U-shaped elevator frame, such operation of the lever 39 rocking the shaft 42 and throwing the wheel 43′ journaled in the bracket 44 to the ground, thereby raising the forward part of the elevator frame and consequently lifting the runners from the ground. As shown in Fig. 1 of the drawing the rod 40 is movably connected to the crank arm 41. This connection is such that it will permit of the outward swinging movement of the arm 41 sufficient to permit the wheel 43′ to swing outwardly from below the conveyers 18 and 19. In the drawing this connection is shown in conventional form only. The rock shaft is disposed normally, when the machine is not in use or is traveling over a road substantially at right angles with the leg 20 and when it is desired to swing the wheel out of the path of operation the lever 39 is shifted to rock the shaft 42 to move the wheel in a forwardly direction. While the wheel is moving from the position shown in Fig. 1 to a position in which the arm 44 will be vertical, the friction between the wheel and the ground prevents the shaft 42 from swinging on its pivotal point 43ª. After the arm 44 passes its vertical position, the friction between the wheel 43' and the ground will be diminished and further movement of the lever 39 will swing the wheel 43' laterally of the machine and out of the path of operation. When it is desired to return the shaft 42 and wheel 43' to their initial positions the operation of the lever 39 is reversed which returns said wheel 43' and lever 42 to the position shown in Fig. 1.

Connected to the boxing 40' is a rod 40ᶜ secured at one end to the runner 35.

When the rod 40 is shifted in opposite directions by the lever 39, the stops 40ª and 40ᵇ will be moved into engagement with the boxing 40', moving the runners 34 and 35 which are held in horizontal position by gravity, so that the forward ends thereof will slant upward or outward as desired. When the lever 39 is shifted in the opposite direction to throw the wheel 43' off of the ground to permit lowering of the U-frame, the runners will fall by gravity to normal ground engaging position.

Journaled on the elevator frame B is a shaft 45 at one end of which is a beveled gear 46 designed to mesh with a beveled gear 47 carried by the part 48 of a sectional shaft including the sleeve 49 in which the part 48 of the sectional shaft is adapted to reciprocate. The part 48 is journaled in a bearing 50 while the part 49 of this extensible shaft is journaled in a bracket 51. The sleeve part 49 of this sectional shaft carries a beveled gear 52 designed to mesh with the beveled gear 53 (Fig. 2) keyed to a shaft 54 journaled in a bearing 55 on the sill 11 of the body frame. On this shaft 54 is a sprocket wheel 56 with which operatively connects a sprocket chain 57 connected to a sprocket wheel 58 carried by the hub 59 of the wheel 12. Therefore, as the wheels 12 and 13 move over the ground, the chain and sprocket connection effects operation of the sectional shaft 48—49, which in turn effects operation of the shaft 45. On this shaft 45 are beveled gears 59' adapted to mesh with the beveled gears 60 at the inner or upper ends of the screws 17 and 18 whereby the latter are rotated in opposite directions in relation to each other in their bearings.

From the foregoing it will be seen that as the harvester is moved along the ground, and it is preferably drawn along by a draft connected to the tongue 61, that the stalks, even if the same be practically flat on the ground, are straightened up and elevated or carried by the elevator screws 17 and 18 up through and between the screws and this straightening or elevation of the material continues until the stalks reach the cutting mechanism A. The cutting mechanism A consists preferably of two disks 62 and 63 mounted on shafts 64 journaled in brackets 65 on the elevator frame. These shafts 64 have beveled gears 66 which mesh with the aforesaid gears 60 on the aforesaid shaft 45 so that as the shaft 45 is rotated the shafts 64 are rotated and consequently the cutting disks are operated to sever the heads from the stalks. The heads are dropped from the cutting mechanism into the hopper 15. If desired, an auxiliary elevating mechanism may be employed and if this auxiliary elevating mechanism be employed it may consist of two screws 67 and 68 mounted in pairs of brackets 69 and 70, respectively, on the elevator frame B. These auxiliary screws 67 and 68 carry beveled gears 71 which mesh with beveled gears 72 on the aforesaid shafts 64 so that if this auxiliary elevator be employed it is operable through the instrumentality of the same means which operates the main elevator.

The topped material falling into the receptacle or hopper 15 passes through the opening 16 in the hopper on to the elevator belt 73 extending under the opening 16 of the hopper and upwardly and outwardly so that by means of the belt the topped material may be conveyed from the hopper to any suitable receptacle or other suitable container not shown in the drawings. This elevator may be driven by means of a beveled gear 81 meshing with a beveled gear 82 on a shaft 83 journaled in a bracket 84 and a shaft 85 having knuckle joint connection with the shaft 83 and at its outer end carrying a beveled pinion 86 meshing with the aforesaid beveled gear $d$. Thus upon rotation of the gear $d$ and the mesh therewith of the beveled pinion $i$ on the shaft $g$, the elevator belt may be driven, the loose mounting of the journal $f$ not causing the elevator casing to swing until desired to turn it from one position to another.

Another form of auxiliary elevator is illustrated in Fig. 5 wherein the auxiliary elevator may consist of toothed belts 74 and 75 operable from the shafts 64 and which pass over sheaves 76 and 77, respectively mounted on stub shafts 78 and 79, respectively, mounted in suitable brackets 80 on the elevator frame B.

In Fig. 6 there is shown a modified form of invention. In this instance the only difference between this modified form and the form of invention first described resides in the elimination of auxiliary elevators and in providing the rear ends of the elevator screws 19' and 20' with the threshing cylinders 91 and 92, respectively, in advance of the beveled gears 60'. These beveled gears 60' are adapted to mesh with beveled gears 93 on the shaft 45' having at one end a beveled gear 46' corresponding with the beveled gear 46 disclosed in the first form so that upon operation of the shaft 45' through the instrumentality of the same mechanism as operates the shaft 45 the screw conveyers 19' and 20' may be operated and consequently the threshing cylinders 91 and 92 also operated with the result that the material may be threshed in the field.

As shown in Fig. 6 the concaves 91' are located adjacent the cylinders 91 and 92 and are provided with teeth each coacting with the teeth of said cylinders 91 and 92 for the purpose of threshing the grain.

A hood 92' is secured to the bars 19 and 20 and covers the previously described threshing mechanism.

In Fig. 1 of the drawing a seat 93' is mounted upon the members 28ᵈ for the convenience of the operator.

What is claimed is:—

1. In a harvester, a body frame, a hopper on the body frame, a vertically swinging elevator frame, screw conveyers carried by the elevator frame, means for raising and lowering the elevator frame, runners carried by the forward end of the elevator frame and means for spreading the sides of the elevator frame.

2. In a harvester, a body frame, a hopper on said frame provided with an opening in its bottom, a swingingly mounted elevator frame, screw conveyers journaled in the elevator frame, means for operating the screw conveyers, means for raising and lowering the elevator frame, runners carried by the elevator frame, a conveyer leading from the opening in the bottom of the hopper and means for spreading the sides of the elevator frame.

3. In a harvester, a body frame, a hopper on the body frame, an elevator frame, screw conveyers in the elevator frame, means for operating the screw conveyers, means for raising and lowering the elevator frame, runners carried by the forward end of the elevator frame, an auxiliary conveyer coöperating with said screw conveyers and means for spreading the sides of the elevator frame.

4. In a harvester, a body frame, a hopper on said frame provided with an opening in its bottom, an elevator frame, screw conveyers journaled in the elevator frame, means for operating the screw conveyers, means for raising and lowering the elevator frame, runners carried by the elevator frame, a conveyer leading from the opening in the bottom of the hopper, an auxiliary conveyer coöperating with said screw conveyers and means for spreading the sides of the elevator frame.

5. In a harvester, a body frame, a hopper on the body frame, an elevator frame, elevating means mounted in the elevator frame, runners carried by the elevator frame, means for operating said elevating means and means for spreading the sides of the elevator frame.

6. In a harvester, a body frame, a hopper on the body frame, an elevator frame, elevating means mounted in the elevator frame, runners carried by the elevator frame, means for operating said elevating means, auxiliary elevating means, a conveyer leading from the hopper and means for spreading the sides of the elevator frame.

7. In a harvester, a body frame, a revoluble hopper on the body frame, an elevator frame, elevating means mounted in the elevator frame, runners carried by the elevator frame, means for operating said elevating means, auxiliary elevating means, a conveyer leading from the hopper, means for revolving said hopper and conveyer and means for spreading the sides of the elevator frame.

8. In a harvester, a supporting member, a U-shaped frame adjustable upon said supporting member, separate conveying means mounted upon each leg of the U-shaped frame and means for spreading the sides of the U-shaped frame and moving the separate conveying means to and from each other.

9. In a device such as described, a wheel support, a U-shaped frame mounted to tilt upon said wheel support, the legs of said U-shaped frame being movable to and from each other, and conveying mechanism carried by the U-shaped frame and shoes attached to the lower ends of the legs of the U-shaped frame and movable to and from each other upon movement of said legs.

10. In a harvester, a wheeled supporting frame, a hopper mounted thereon, an elevator frame mounted to tilt upon said frame, means for tilting said frame, a roller engaging the tilting frame, and means to adjust said roller to conform to the position of said frame.

11. In a harvester, a supporting frame, a U-shaped conveyer frame mounted in the supporting frame, one of the legs of said U-shaped frame being pivoted, means for spreading the sides of the U-shaped frame and moving the legs thereof to and from each other, a lever pivoted to one leg of the U-shaped frame, and a link attached to the other leg of the U-shaped frame and pivotally connected to said lever whereby upon operation of the lever the legs of the U-shaped frame may be spread.

12. In a harvester such as described, a supporting frame, a tilting conveyer frame mounted in the supporting frame, a wheel supporting said tilting conveyer frame when the latter is in raised position, and means for simultaneously swinging said wheel to inoperative position upon the lowering of said tilting frame.

13. In a harvester such as described, a swinging conveyer frame, means for supporting said frame, runners carried by the frame, and means attached to one of said runners for raising or lowering the frame, and coöperating terminals provided upon said runners for retaining the latter in a predetermined position upon raising and lowering of the frame.

In testimony whereof I affix my signature in presence of two witnesses.

J SIDNEY BACHTEL.

Witnesses:
 T. H. BLACK,
 C. H. HYDE.

Copies of this patent may be obtained for five cents each, by addressing the "Commissioner of Patents, Washington, D. C."